(12) United States Patent
Youn

(10) Patent No.: US 7,099,861 B2
(45) Date of Patent: Aug. 29, 2006

(54) SYSTEM AND METHOD FOR FACILITATING INTERNET SEARCH BY PROVIDING WEB DOCUMENT LAYOUT IMAGE

(75) Inventor: Seok Ho Youn, Seoul (KR)

(73) Assignee: CCR Inc., Seoul (KR)

(*) Notice: Subject to any disclaimer, the term of this patent is extended or adjusted under 35 U.S.C. 154(b) by 831 days.

(21) Appl. No.: 09/877,853

(22) Filed: Jun. 7, 2001

(65) Prior Publication Data

US 2001/0056418 A1    Dec. 27, 2001

(30) Foreign Application Priority Data

Jun. 10, 2000    (KR) ................................ 2000-31999

(51) Int. Cl.
*G06F 17/30* (2006.01)
*G06F 7/00* (2006.01)
(52) U.S. Cl. ............................................. 707/3; 707/6
(58) Field of Classification Search .................... 707/3, 707/5, 6, 104.1, 10; 713/200; 715/500.1, 715/513
See application file for complete search history.

(56) References Cited

U.S. PATENT DOCUMENTS

| 5,899,999 | A | * | 5/1999 | De Bonet ................. 707/104.1 |
| 5,907,837 | A |   | 5/1999 | Ferrel et al. |
| 5,963,966 | A | * | 10/1999 | Mitchell et al. ............. 715/513 |
| 5,978,799 | A |   | 11/1999 | Hirsch |
| 6,167,382 | A | * | 12/2000 | Sparks et al. ................. 705/26 |
| 6,202,061 | B1 | * | 3/2001 | Khosla et al. ................. 707/3 |
| 6,651,059 | B1 |   | 11/2003 | Sundaresan et al. ........... 707/6 |
| 2002/0038299 | A1 | * | 3/2002 | Zernik et al. .................. 707/3 |
| 2003/0208688 | A1 | * | 11/2003 | Bobo, II ..................... 713/200 |

FOREIGN PATENT DOCUMENTS

| JP | 11-282870 | 10/1999 |
| JP | 2000-76264 | 3/2000 |
| KR | A 2001-0106925 | 12/2001 |
| WO | WO 02/29623 A1 | 4/2002 |

OTHER PUBLICATIONS

Sclaroff, et al., ImageRover: A Content-Based Image Browser for the World Wide Web, Content-Based Access of Image and Video Libraries, 1997, IEEE, pp. 2-9.

* cited by examiner

*Primary Examiner*—Sam Rimell
(74) *Attorney, Agent, or Firm*—Knobbe Martens Olson & Bear LLP

(57) ABSTRACT

A search system on the Internet provides a search result in response to search criteria provided by a user. The search system comprises a robot agent for extracting web document information and layout images of web documents on the Internet; a first database for storing the web document information extracted by the robot agent; a second database for storing the layout images extracted by the robot agent; and a search unit for retrieving web document information and layout images, a, from the first database and the second database, respectively, in response to the search criteria.

10 Claims, 15 Drawing Sheets

SYSTEM AND METHOD FOR FACILITATING INTERNET SEARCH BY PROVIDING WEB DOCUMENT LAYOUT IMAGE

BACKGROUND OF THE INVENTION

1. Field of the Invention

The present invention relates to an Internet search system. In particular, the invention relates to a search system and method for facilitating an Internet search for web sites having desired information, by providing the image of a web document to a user before the user actually accesses the web document from a corresponding server.

2. Description of the Related Art

Web documents (also known as web pages) are electronic files that contain many forms of information, including text, graphics, video, audio, and links to other Web documents. Presently, Hypertext Mark-up Language (HTML) is the standard format for documents on the World Wide Web. An HTML formatted document has HTML codes, i.e., commands, embedded in the document. A software application known as a Web browser is used to access documents on the Web. By understanding HTML, Web browser software can properly display a Web document on a user's output display device. More importantly, Web browser software interprets the HTML commands in an HTML formatted Web document to navigate a link in that Web document to another Web document. The Web browser thereby provides automatic access to other Web documents on the Web.

A web site is where a collection of web documents on a particular topic are stored on a server and identified by a URL. The first document transmitted to users who access the web site is called a home page. From the home page, users can get to all the lined documents on the web site by "clicking" links the documents. Users can locate web sites of interest by using a search engine offered by Internet companies at their web sites.

Typically, a search system run by those "portal" internet sites comprises a search engine and a classified directory table. Well known are Yahoo!, Lycos, Infoseek, etc. Typical search engines include a robot agent, an index program and a search program. The robot agent, also know as software-implemented web crawlers, automatically visits web sites, and trace hypertext links therein, in seriatim and extracts, abstracts and index each document encountered therein, through so-called key words, into a large database for subsequent access. The index program extracts and registers indexes for the collected web documents. The search program provides a list of web sites that it determines relate to a search query sent from the user, based on predetermined criteria. The directory table classifies the collected web sites by subject in many depth levels. One can narrow down from a broad subject/category to its successive sub-categories. The indexes for the classified directory are predetermined and registered in the search system.

However, conventional search systems record only limited information on the web sites they visit, e.g., web addresses, i.e., URLs through which the corresponding document can be accessed by a web browser, content words, titles and short summaries of the contents, and possibly the description of the document as provided in its HTML description field. The brief description of a web site is commonly written by the operator of the web site as introduction to the web site. In most cases, however, it is very difficult for a user to know whether a web site includes information he or she wants or not simply by reading its brief description.

Hence, in the conventional search system, the user has to access a searched web site to see the contents of the web documents of the site. If the contents do not have sought for information, the user would return the search site to view the search result to select another search web site. This search process is repeated until the user lands on a useful web site or decides to quit. As a result, the user is likely to spend much time and effort in navigating a number of web sites before he or she locates a desired web site. And, even when the user reaches the proper web site, the user would not recognize that if the web site were currently out of service.

Therefore, what is needed is a way to find out what the actual contents of web documents would be before visiting each of a list of web sites provided by a search engine.

SUMMARY OF THE INVENTION

It is, therefore, a primary objective of the present invention to provide a search system that facilitates web document search via the Internet by providing web document layout image in addition to web document information.

In accordance with one aspect of the present invention, there is provided a search system on the Internet for providing a search result in response to search criteria provided by a user, comprising: a robot agent for extracting web document information and layout images of web documents on the Internet; a first database for storing the web document information extracted by the robot agent; a second database for storing the layout images extracted by the robot agent; and a search unit for retrieving web document information and layout images from the first database and the second database, respectively, in response to a search criteria.

In accordance with another aspect of the present invention, there is provided a method for providing a search result including web document information and layout images of web documents on the Internet, comprising the steps of: extracting web document information and layout image from each of web documents and storing the extracted web document information and the layout images in a first database and a second database, respectively; receiving a search criteria from a user; retrieving the web document information and the layout image corresponding to the search criteria from the first database and the second database, respectively; and providing the web document information and the layout image aligned in a viewing format identified by the user.

BRIEF DESCRIPTIONS OF THE DRAWINGS

The above objectives and features of the present invention will become apparent from the following description of embodiments given in conjunction with the accompanying drawings, in which.

Figure 6:
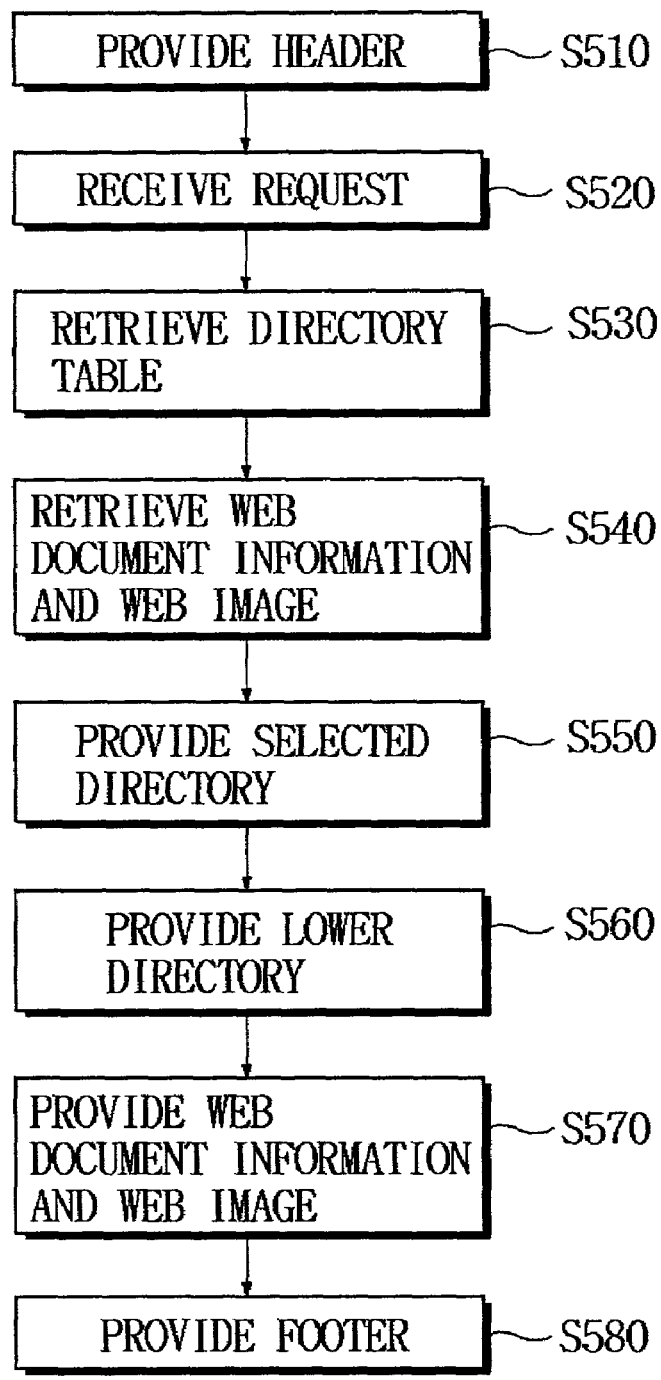
Figure 7:
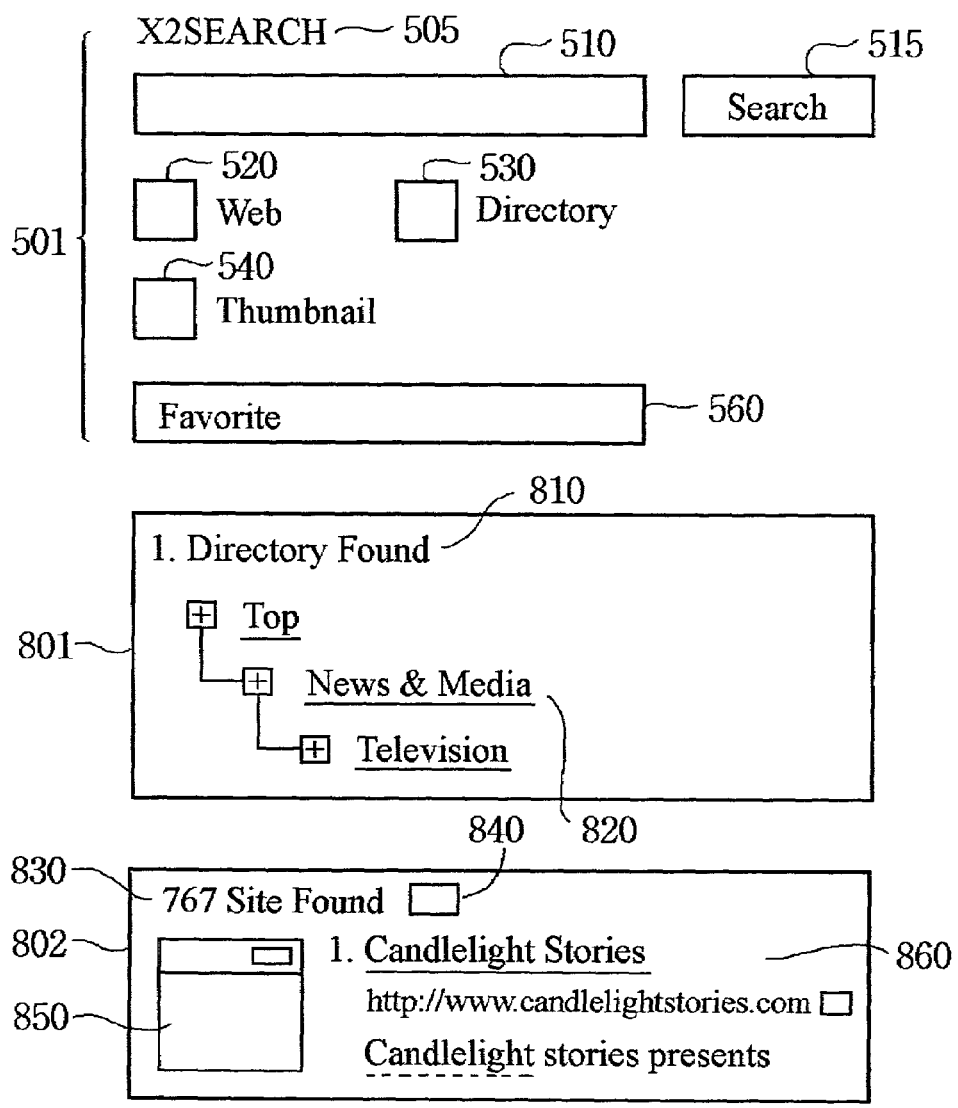
Figure 8:
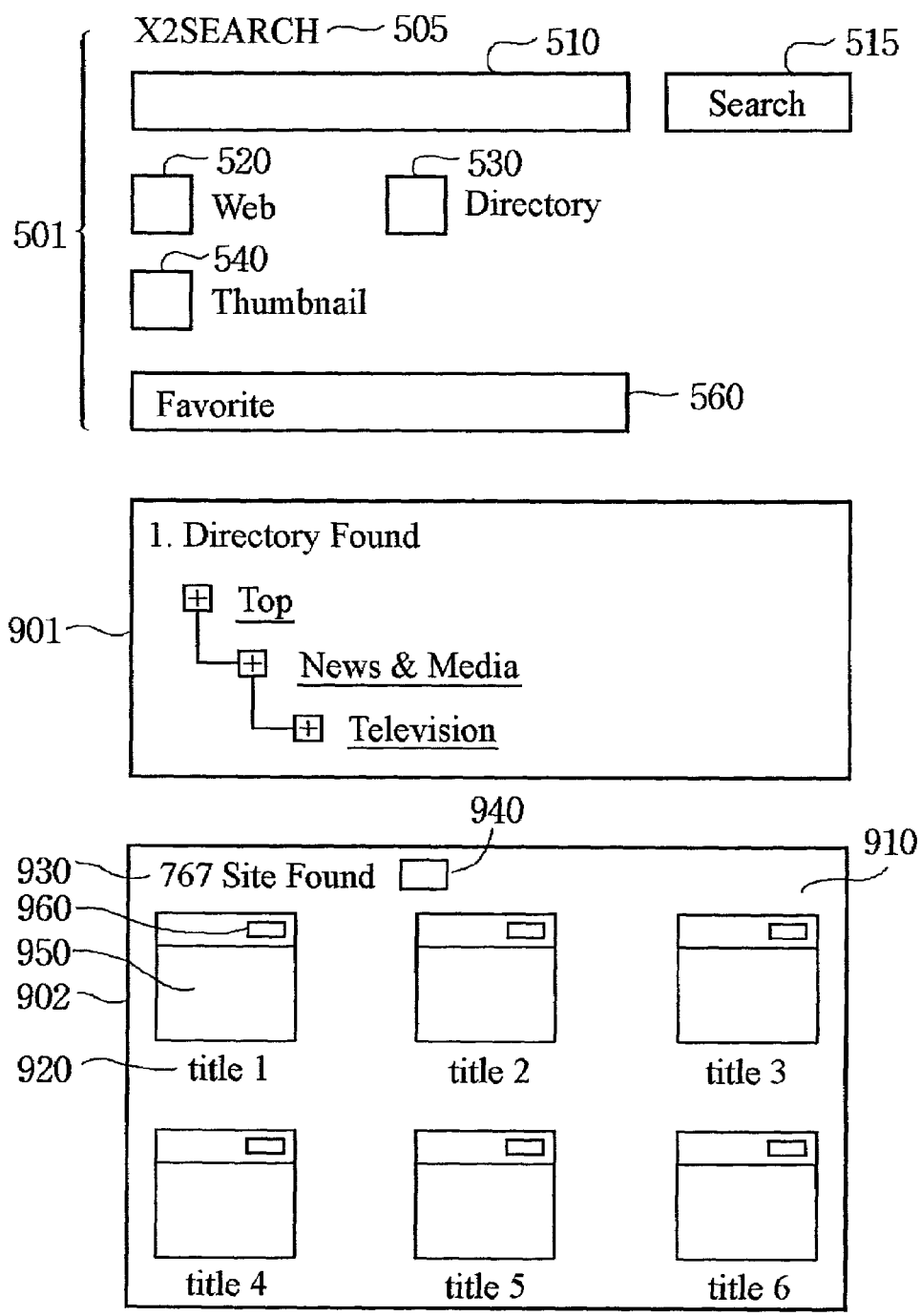
Figure 9:
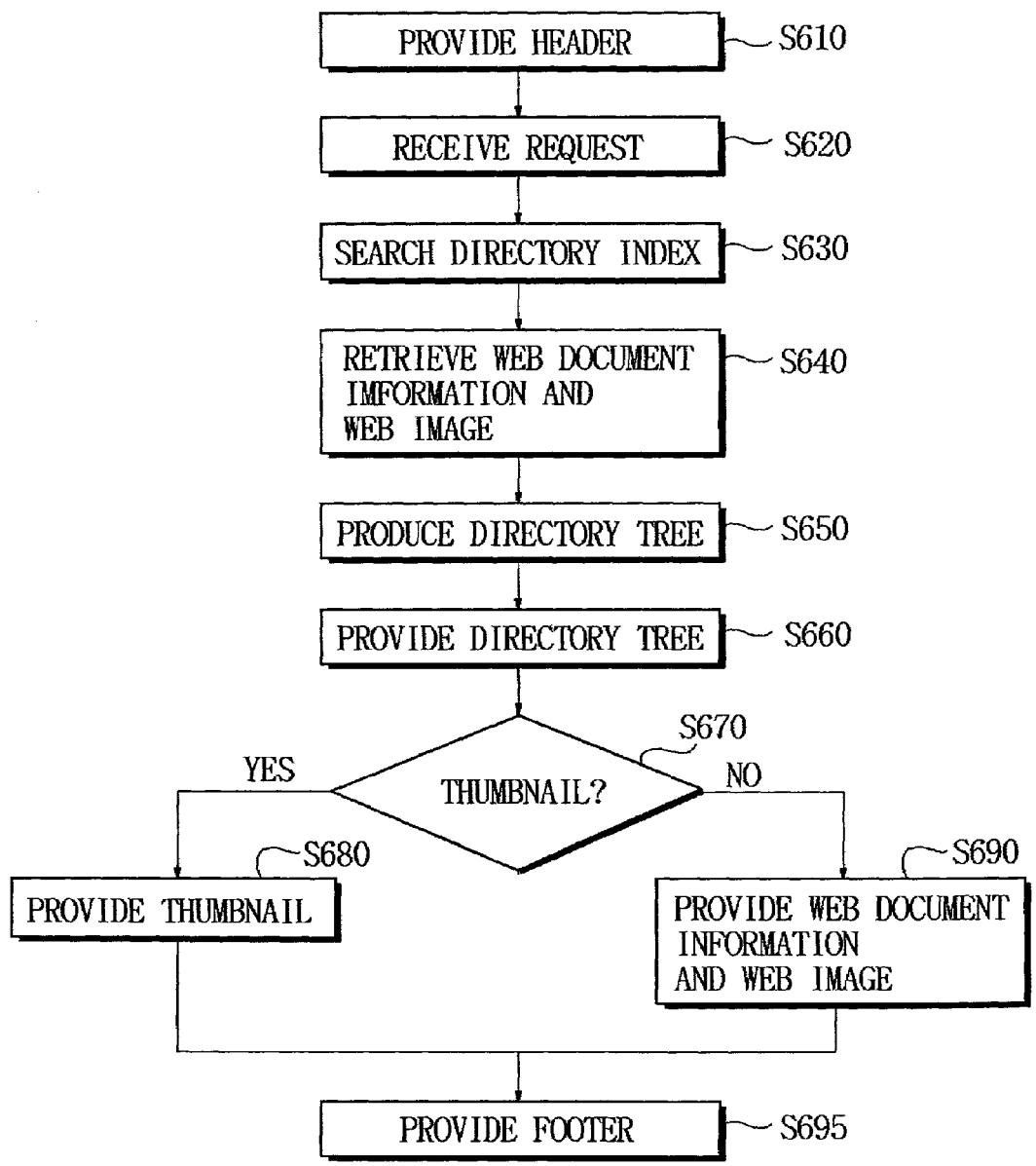
Figure 10:
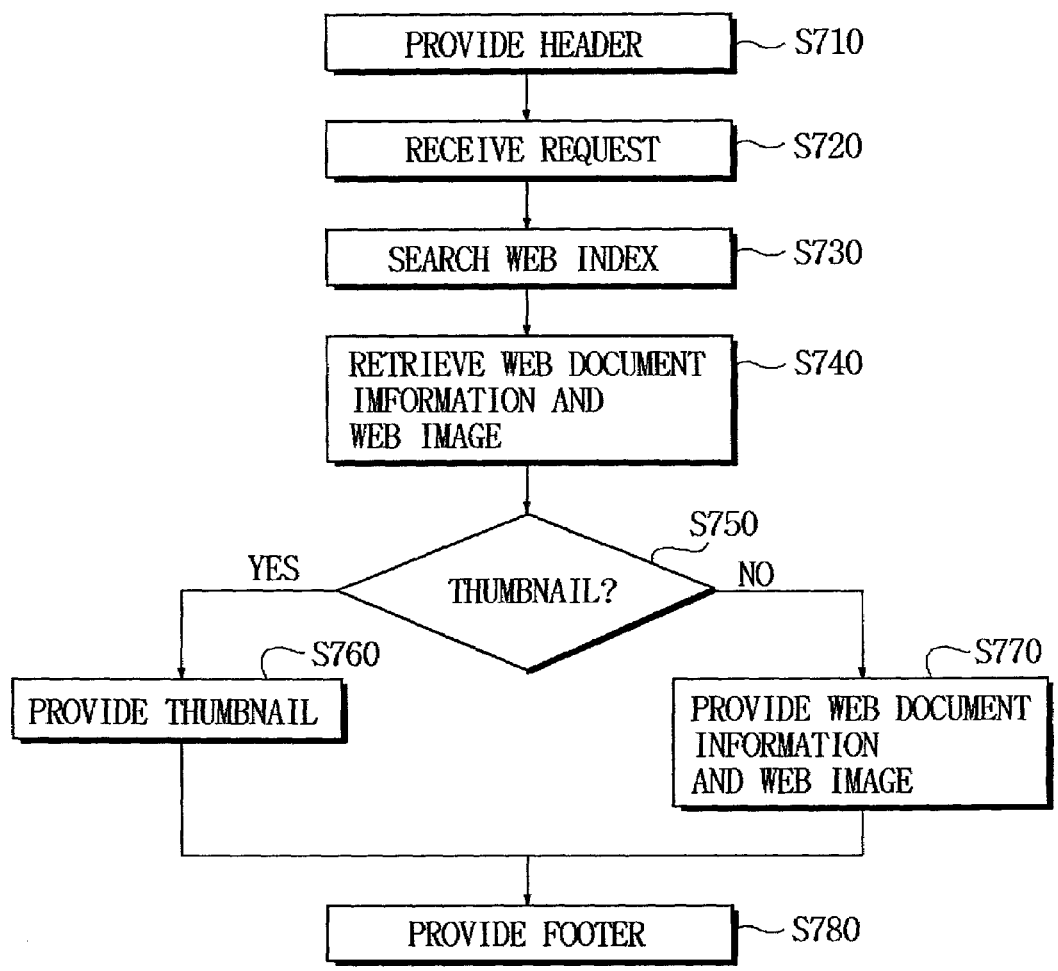
Figure 11:
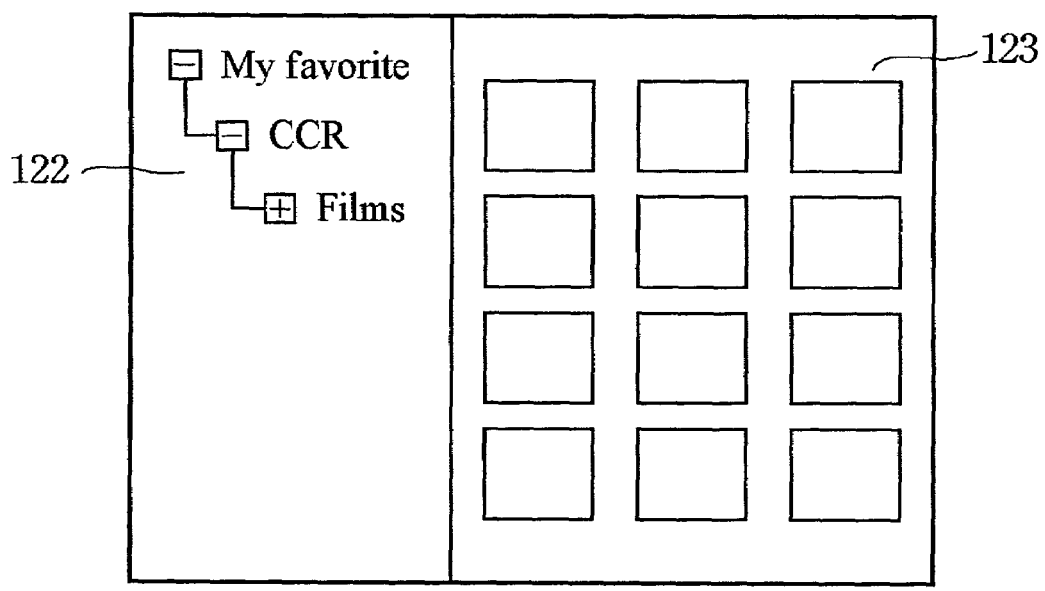
Figure 12:
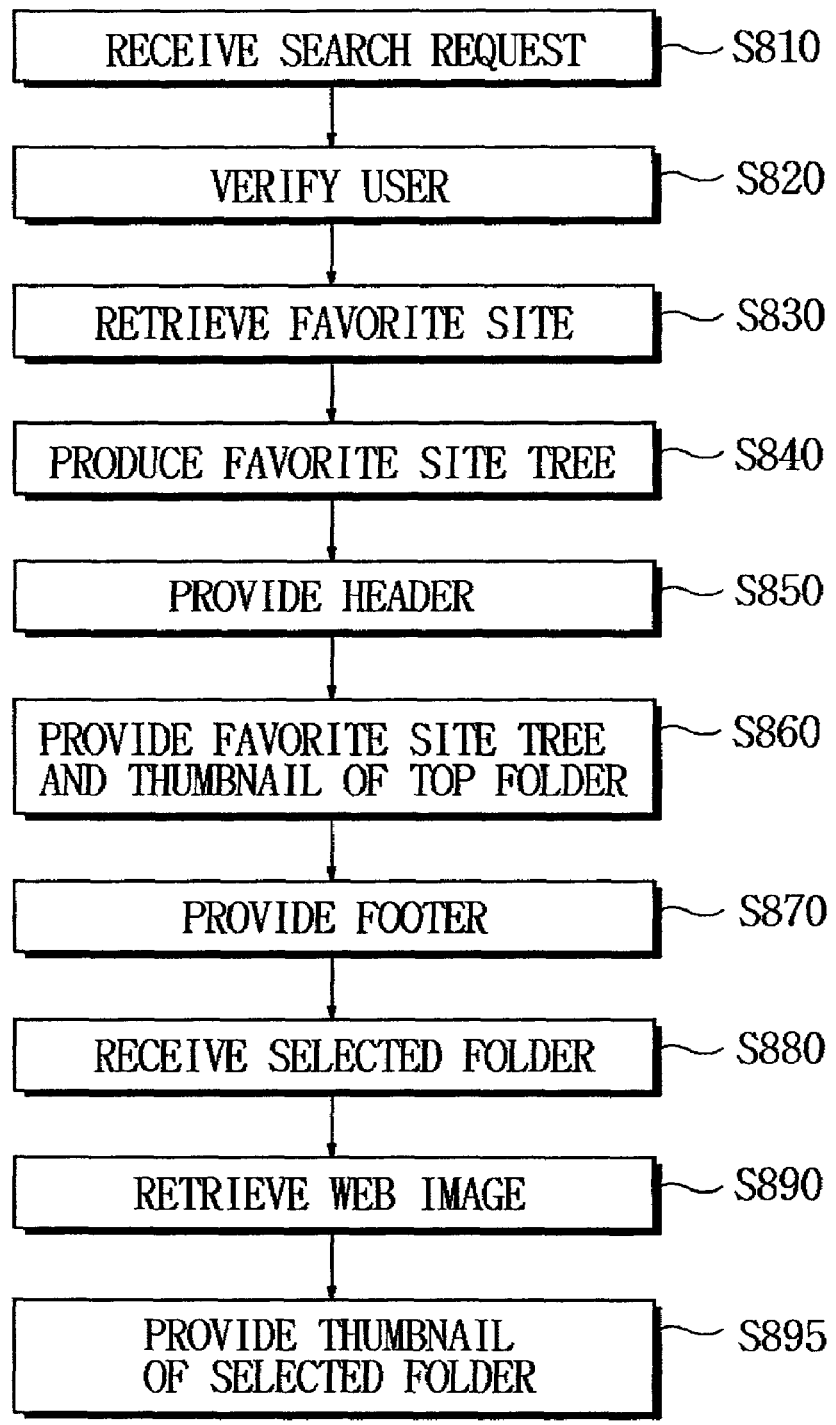
Figure 13:
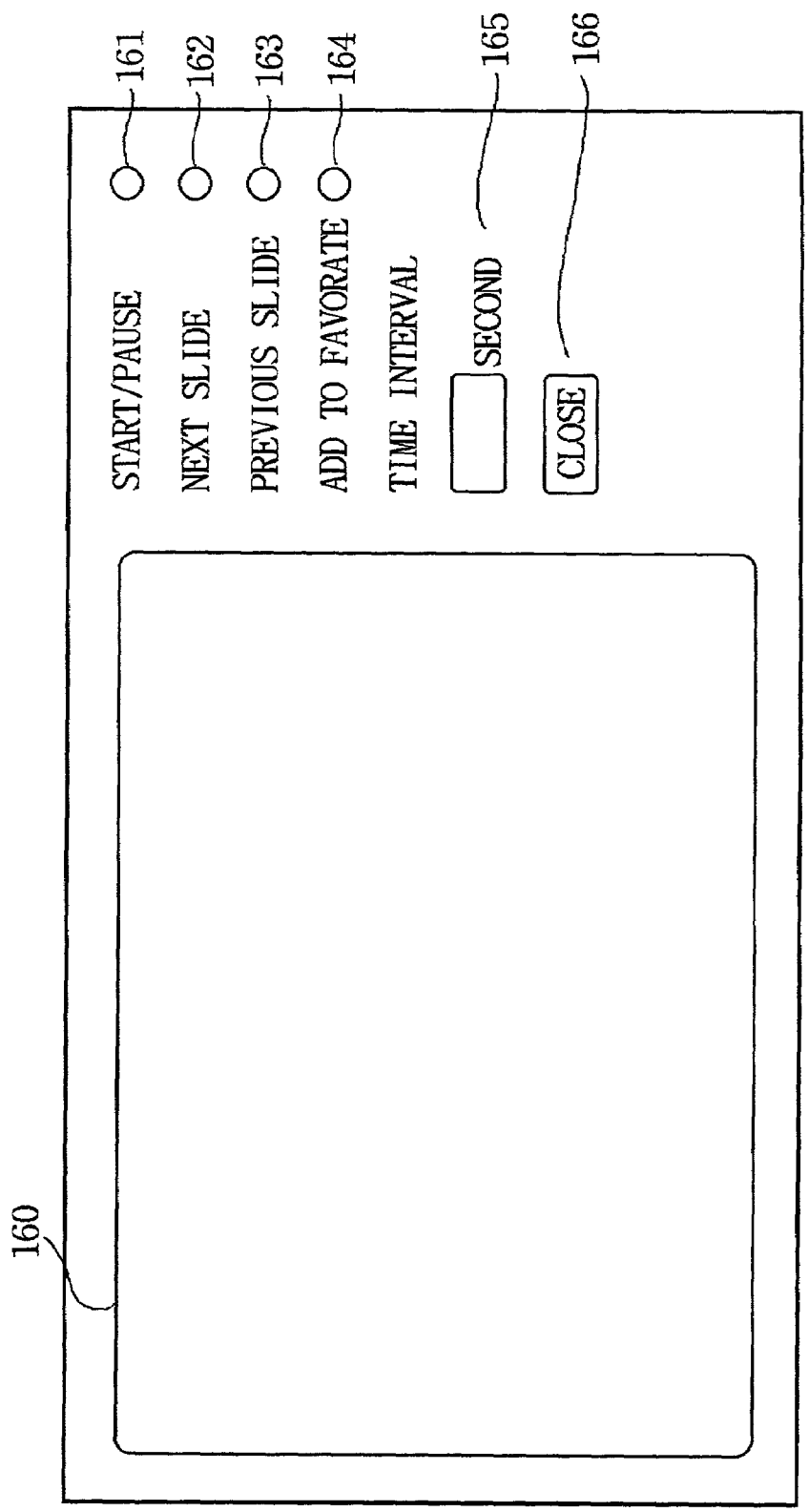
Figure 14:
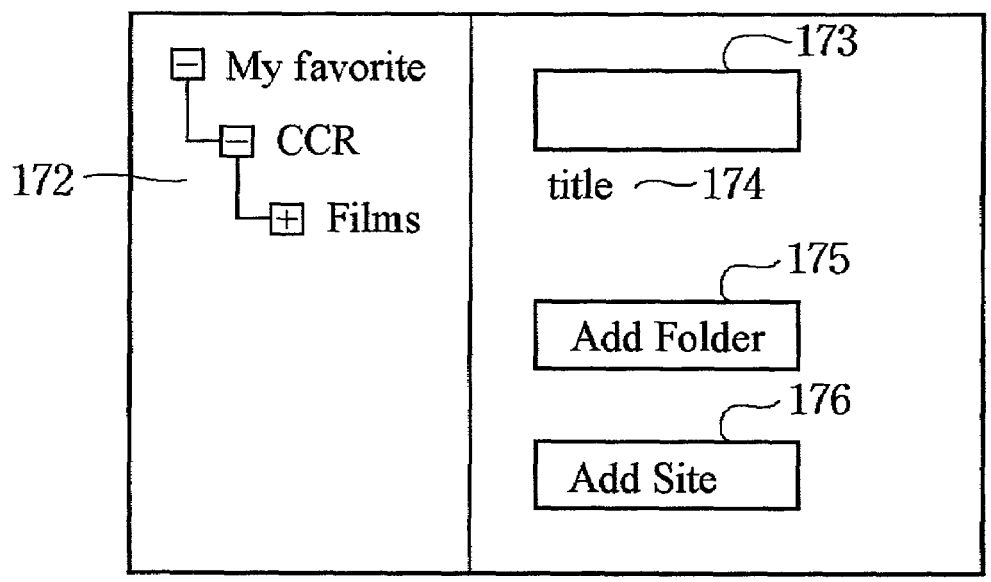

FIG. 6 offers a flow chart providing a directory search result;

FIG. 7 illustrates a display layout providing query search result for directories;

FIG. 8 illustrates another display layout providing query search result for directories;

FIG. 9 offers a flow chart of providing a query search result for directories;

FIG. 10 offers a flow chart of providing a query search result found among web documents;

FIG. 11 illustrates a display layout providing a favorite site list;

FIG. 12 presents a flow chart of providing a favorite site list;

FIG. 13 illustrates a browser layout of slideshow;

FIG. 14 shows a display layout for adding a site to favorite sites; and

Figure 15:
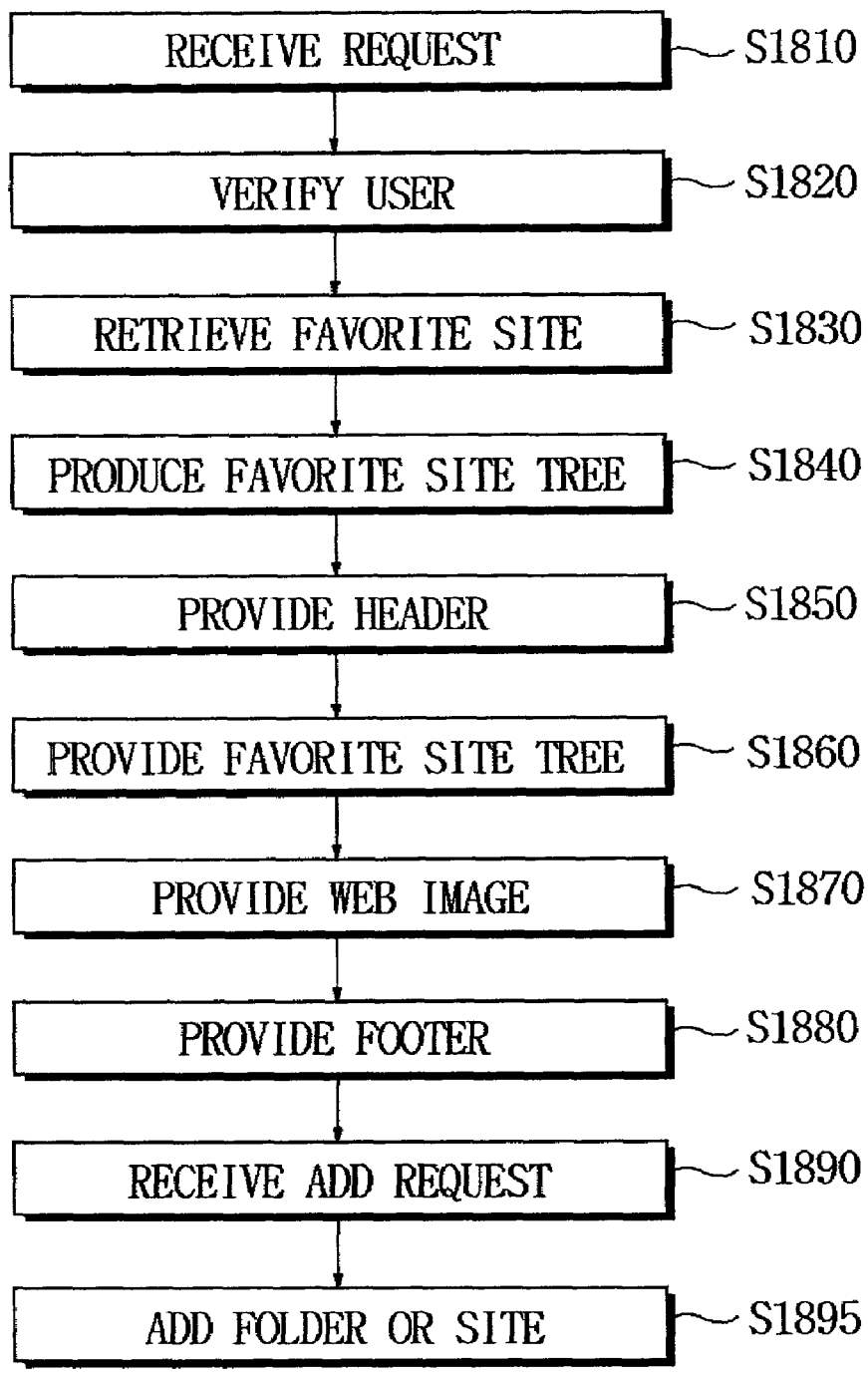

FIG. 15 provides a flow chart of adding a site to favorite sites.

DETAILED DESCRIPTION OF THE PRESENT INVENTION

Figure 1:
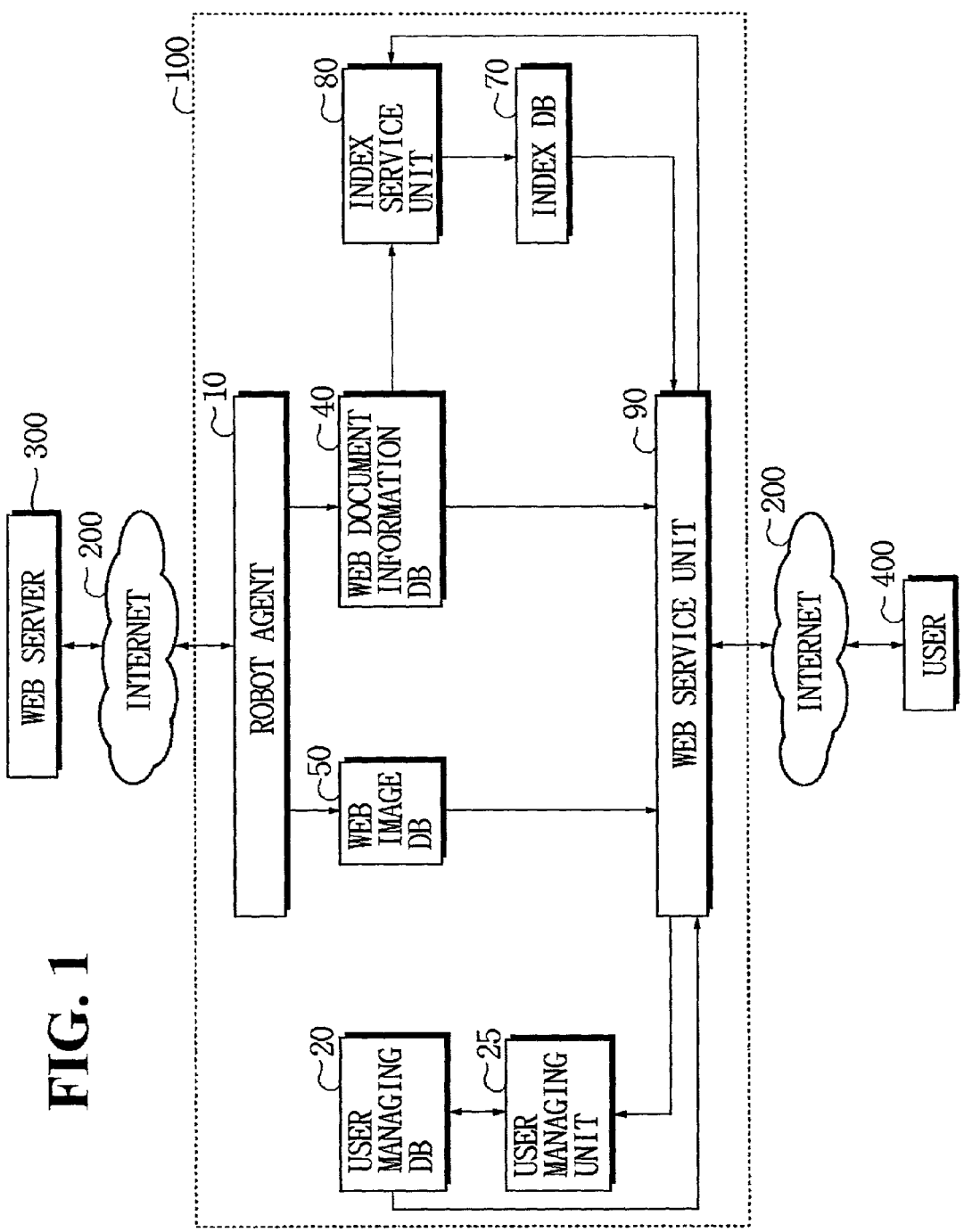
FIG. 1 is a block diagram of an embodiment of a search system in accordance with the present invention.

Referring to FIG. 1, there is provided a block diagram of an embodiment of the inventive search system. The search system 100 is operatively coupled to a number of external web servers (only one external web server 300 is shown) and a plurality of users (only one user 400 is shown) through the Internet 200. The user 400 accesses the search system 100 by using a typical Internet web browser. The search system 100 requests web documents from the external web servers 300 via the Internet 200, collects information on their web documents and provides the collected information to the user 400 via the Internet 200. It provides not only bibliographic information on web sites (hereinafter, "web document information"), such as titles, brief descriptions and the number of visits to the web sites as done by the conventional search systems. But it also provides web document layout images (hereinafter, "web image") to the user 400, unlike the conventional systems. According to the present invention, when a requested web document coded in the HTML format arrives, the layout of the web document defined by HTML codes such as "tags" is discriminated. That is, the text, graphics, audio, and video of the web document are separately identified and compressed using any of industry standards for data compression and/or conversion. Then reformatted web contents are rearranged as a web document image in such a way that the recreated image looks substantially like the original web document. Not all the elements of the web document need to be reproduced in the web document image. However, the web image should preferably contain information representative of the web document that is readily recognizable at a glance. The scaled-down versions of these web images are also produced so that the search system 100 can provide multiple web images simultaneously to the user 400 in the form of thumbnails. It can also provide a slideshow where multiple web images are displayed one by one in full screen at a selected time interval. Users can register their favorite site lists (or bookmark) in the search system 100 which then provides the web images of the favorite sites to the user 400 along with the favorite site list.

The search system 100 comprises a robot agent 10, a user managing DB (database) 20, a user managing unit 25, a web document information DB 40, a web image DB 50, an index DB 70, an index service unit 80 and a web service unit 90. The robot agent 10 is connected to the external web server 300 through the Internet 200. And the web service unit 90 is connected to the user 400 through the Internet 200. The major functions of the search system 100 shown in FIG. 1 are i) gathering web document information via the Internet 200, ii) storing gathered information in a structured way, iii) providing information which users request from the stored information and iv) managing user information and their favorite site lists. The first two functions, i.e., gathering and storing information, will be first explained referring to corresponding blocks in FIG. 1. The robot agent 10 visits the web sites to collect web document information. In other words, it requests web documents from the external web servers where the web sites are physically located and extracts web document information such as title, abstract text, linked URLs (Uniform Resource Locators) and a visit number from the received web documents. The web document information is stored at the web document information DB 40. Web images constructed from the web documents are stored at the web image DB 50. The index service unit 80 extracts key words from the title and brief description of each web document and registers them at the index DB 70. The index DB 70 stores the keywords that are indexed to the corresponding web document. It also stores keywords predetermined for each of directories included in a directory table produced by a method used for directory search and query search in conventional search systems and registered at the web service unit 90.

The web service unit 90 provides the user 400 with a directory list referring to the directory table and receives search criteria from the user 400. It searches the directory table and/or index DB 70 for web documents corresponding to the search criteria. Then it retrieves web document information and web images of the searched web documents from the web document information DB 40 and the web image DB 50, respectively. It also provides the user 400 with a search result by simultaneously displaying the web images and the web document information. It can provide the web images in the form of thumbnails or slideshow as described in detail below and also provides the search result in the order of the visit numbers to the web documents.

The user managing unit 25 receives from the user 400, via the web service unit 90, user information including account information such as user names, passwords, and favorite sites. After verifying the user 400, it registers and updates such information in the user managing DB 20. For example, when the unit 25 receives a request from the user 400 via the web service unit 90 to retrieve his/her favorite site list, it retrieves folders and sites stored in the user managing DB 20 and provides the retrieved folders and sites to the user 400. The unit 25 produces a favorite site tree for each user by using his/her favorite sites that were previously stored at the user managing DB 20 so that it is able to provide the web images of the favorite sites to the user 400 along with the favorite site tree.

Figure 2:
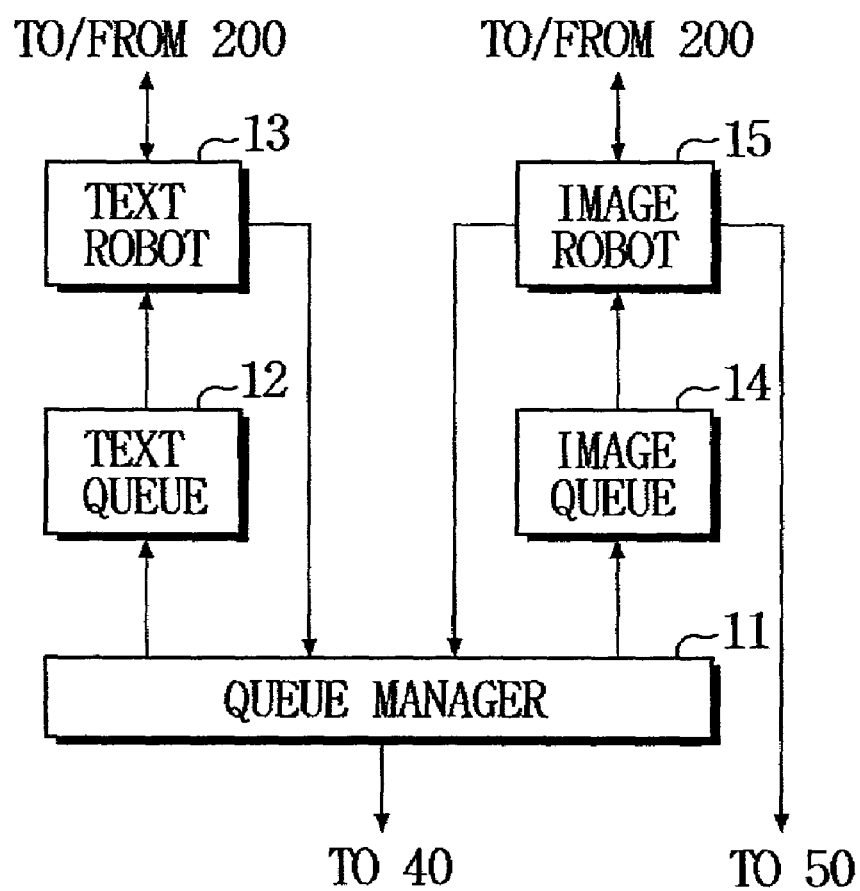
FIG. 2 shows a detailed block diagram of a robot agent shown in FIG. 1.

FIG. 2 shows a detailed block diagram of the robot agent 10 of FIG. 1, which includes a queue manager 11, a text queue 12, a text robot 13, an image queue 14 and an image robot 15. The queue manager 11 is coupled to the text queue 12, the text robot 13, the image queue 14 and the image robot 15. The text queue 12 and the image queue 14 are coupled to the text robot 13 and the image robot 15, respectively. The text queue 12 initially registers the URLs of web sites for the text robot 13 to visit in an order predetermined by an operator of the system 100. When the text robot 13 requests a URL to visit from the queue manager 11, the queue manager 11 controls the text queue 12 to provide a URL having the highest visiting priority in the text queue 12 to the text robot 13. The text robot 13 visits the site identified by the URL and initiates downloading of web documents from the site. The text robot 13 then extracts web document information from the web documents and sends the web document information to the queue manager 11. Then, the queue manager 11 stores the URL of the visited site in the image queue 14 and registers the web document information at the web document information DB 40. Also, the queue manager 11 grades the URLs according to predetermined criteria and distributes the URLs to the text queue 12 such that the visiting priorities of the URLs at the text queue 12 are reassigned. For example, the queue manager 11 generates normal distribution having its mean and variance at a mean and a variance of the visit numbers of all web documents that have been already visited and are to be visited. Then, the queue manager 11 computes confidence level of the visit number for each of the referred URLs based on the generated normal distribution as the importance level for each of the referred URLs. Then, the queue manager 11 reassigns the visiting priority based on the computed confidence level to the URLs to be visited.

On the other hand, when the image robot 15 requests a URL from the queue manager 11, the queue manager 11 controls the image queue 14 to provide a URL, having the highest visiting priority in the image queue 14, to the image robot 15. The image robot 15 visits the site of the URL and initiates downloading of the web document from the visited site. Then, the image robot 15 extracts the web image from the web document and registers the web image at the web image DB 50.

Figure 3:
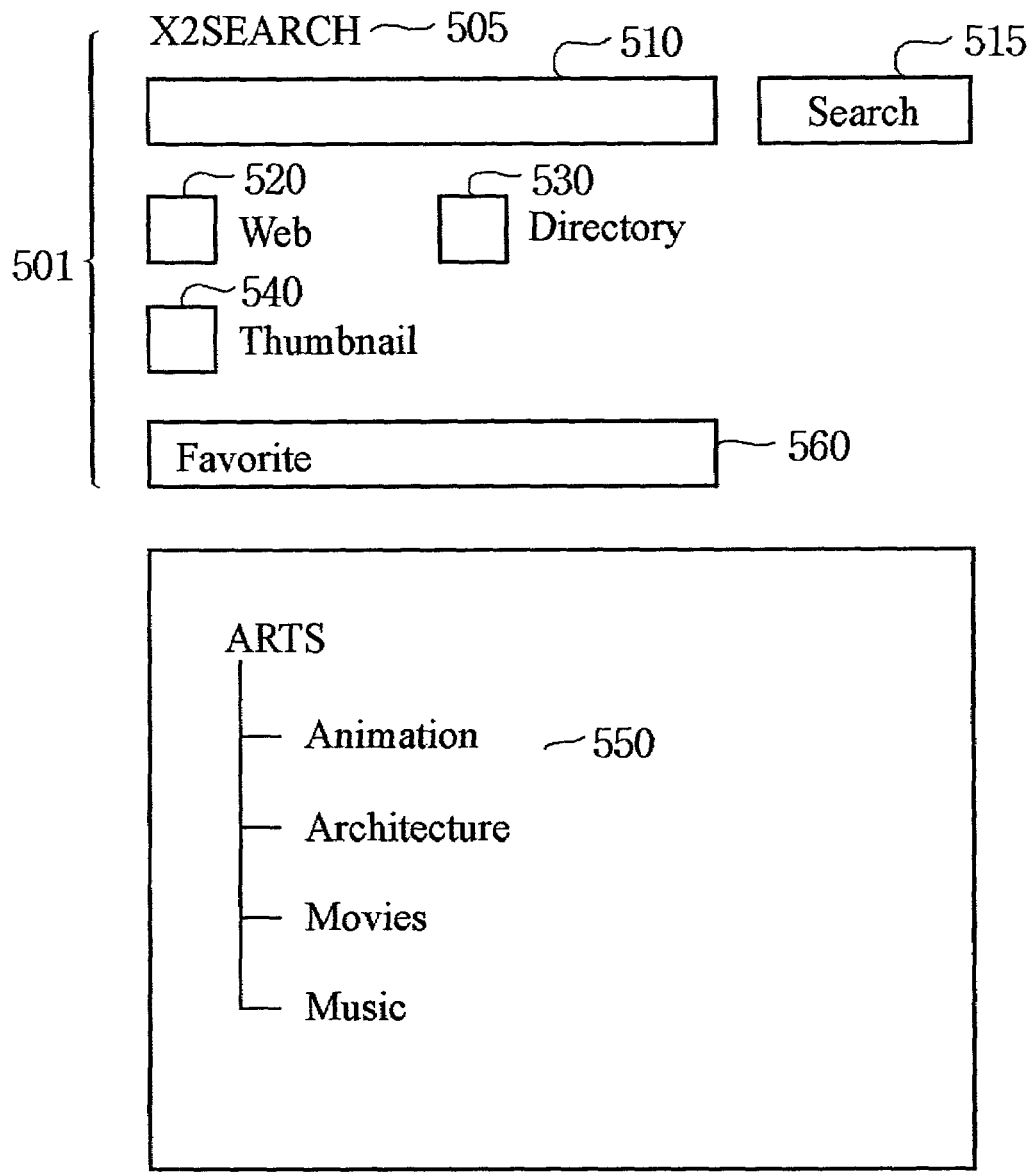
FIG. 3 is an example of Home Page layout provided by a search system of the present invention.

FIG. 3 is an exemplary page layout that could be provided to the user 400 of the search system of the present invention. The page would have a query input field 510 and a search start button 515 for a keyword search. The user 400 can either search the Web directly by entering a search query or narrow down the classified directories by checking boxes 520 or 530, respectively. A check box 540 is further provided such that, when selected, the thumbnail images of web documents are displayed. A button 560 may be provided for using or registering a favorite site list. The search result is displayed in a display format predefined by the user 400, e.g., in text only, web image only, or text and web image simultaneously. A header 505 and a footer 502 may be displayed to provide proprietary information of the system provider. Like other search systems, the search system 100 also provides a classified directory tree 550 in the middle of the home page.

Figure 4:
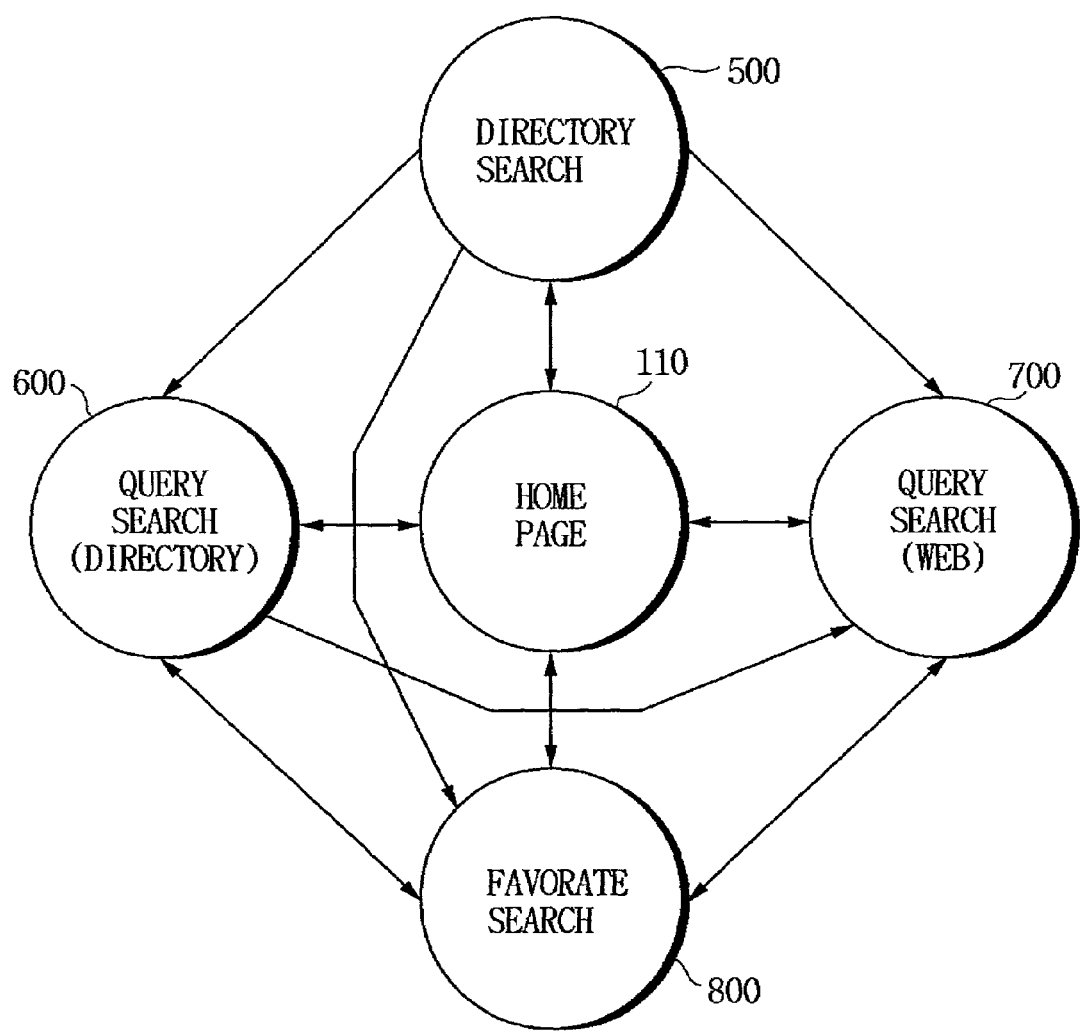
FIG. 4 represents search services provided by a search system in accordance with the present invention.

FIG. 4 represents a diagram for explaining various search modes provided by the search system 100 of the present invention, which can be selected by users based on their search styles or preferences. A circle 110 represents a starting point as the first page list possible search modes to choose from. Circles 500, 600, 700 and 800 depict a directory search mode, a query search mode of directories, a query search mode of web documents and a favorite site search mode, respectively, which will be explained below.

When the user 400 accesses the search system 100 according to the present invention through a network, the Internet 200 for example, the search system 100 transmits its home page to the user 400. The user 400 then selects one of the directory search mode, the query search mode of directories, the query search mode of web documents and the favorite site search mode, and all listed in the home page.

If the directory search mode 500 is selected, the search system 100 provides with the user 400 subdirectories and/or the web documents included in a corresponding directory selected by the user 400. As depicted by arrows in FIG. 4, the user 400 may jump to any one of the other service modes from the directory search mode 500. If the query search mode of directories 600 is selected, the search system 100 looks through all the directories to see if there is a directory containing a query word and, if any, provides it to the user 400. Likewise, the user 400 may move to one of the service modes 110, 700 and 800 upon request. In case of the query search mode of web documents 700, the search system 100 uses the search engine to find web sites relevant to a search keyword and provides the search result, i.e., URLs and brief descriptions of those relevant sites, to the user 400. The user 400 may move to one of the service modes 110, 600 and 800 upon request. According to the present invention, the web images of the web documents would be included as part of the search result. In the favorite site search mode 800, the search system 100 provides the list of favorite sites preselected by the user 400. From this mode, the user 400 may also move to the service modes 110, 600 and 700. Web images included in a selected folder of the favorite site list are also provided to the user 400.

Figure 5:
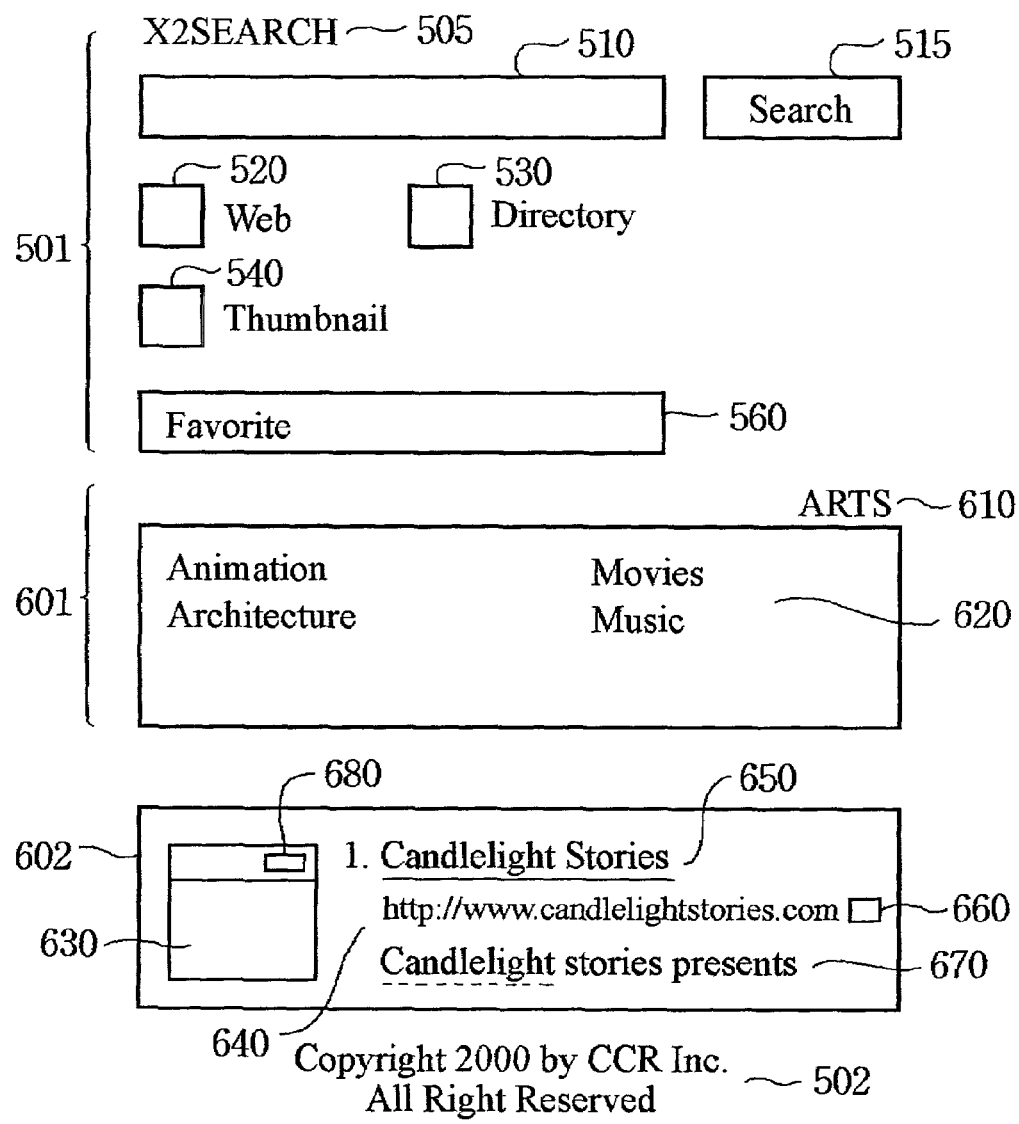
FIG. 5 illustrates a display layout providing directory search result.

FIG. 5 illustrates an exemplary screen for providing a directory search result. Specifically, it illustrates a case when an ARTS category/subdirectory from the directory is selected. Subdirectories 620 of the selected category are displayed as well as scaled-down web images 630 and web document information 640 of the web sites included in the selected directory. Because of the limited size of a screen only some of those web sites would be displayed. To see those of the remaining web sites the screen should be scrolled. The web document information 640 includes a title 650 and a brief description 670.

When the user 400 clicks the scaled-down web image 630, a full web image (not shown) is displayed in a separate window. The user 400 can directly visit the corresponding web site by clicking the title 650, as is done in conventional search systems. Furthermore, clicking an add-to-favorite site button 680 will open a new window, as shown in FIG. 14, to allow the user 400 to add a web site to his/her favorite site list.

FIG. 6 offers a flow chart for providing a directory search result as carried out by the web service unit 90. First, the header 505 is provided to the user 400 (Step S510). A user input for selecting a directory is received (Step S520). In response, the web service unit 90 retrieves subdirectories and web sites included in the selected directory from the directory table (Step S530). It further retrieves web document information and web images included in the selected directory from the web document information DB 40 and the web image DB 50, respectively (Step S540). The selected directory 510 is provided to the user 400 (Step S550). Subsequently, the subdirectories 620 included in the selected directory are provided to the user 400 (Step S560). The web service unit 90 provides the web document information 640 and web images 630 included in the selected directory 610 to the user 400 before finally providing a footer 502 (Steps S570 and S580).

FIGS. 7 and 8 are examples of a layout providing query search result for directories.

The header 505 and the footer 502 in FIG. 7 are provided to the user 400 in a similar manner as shown in FIGS. 3 and 5. A number of found directories 810 and a directory tree 820 of the found directory are displayed at an upper part 801. And, the layout and function of a lower part 802 is similar to that of FIG. 5 except that a number of found sites 830 and a thumbnail view field 840 are included in FIG. 7. When the user 400 clicks the thumbnail view field 840, the layout shown in FIG. 7 is changed to a thumbnail layout as will be shown in FIG. 8.

In FIG. 8, an upper part 901 is identical to the upper part 801 of FIG. 7. A lower part 902 shows thumbnail images 910 of the found sites. Titles 920 of each site are truncated and displayed below corresponding iconic web images 950 and add-to-favorite buttons 960 are also provided. In one embodiment of the present invention, the web document information of each site may be displayed only when a cursor is located on one of the iconic web images 950. When the user 400 clicks one of the iconic web images 950, a corresponding full-screen web image is provided in a separate window.

A display layout for providing a query search result found among web documents is similar to that of FIGS. 7 and 8 except that the information on the found directory is not included in case of web document search.

FIG. 9 offers a flow chart for showing a query search result found among directories. The web service unit 90 provides the header 505 to the user 400 (Step S610) and then receives a request from a user for selecting one or more directories and web documents that matches the user's request (Step S620). It searches one or more directories and web documents that matches the user's request in index DB 70 (Step S630) and then retrieves the web document information and the web image of the found web documents, respectively, in the web document DB 40 and the web image DB 50 (Step S640). It also produces the directory tree 820 (Step S650) and provides it to the user 400 (Step S660). It then determines whether thumbnails are selected (Step S670). If the thumbnails are selected, step S680 is performed. Otherwise step S690 is taken. The web service unit 90 provides the selected thumbnail images 910 to the user 400 (Step S680). At step S690, the web service unit 90 provides web images and text information simultaneously to the user 400 and proceeds to step S695. Finally a footer 502 is provided to the user 400 (Step S695).

FIG. 10 offers a flow chart for showing a query search result found among the web documents. The web service unit 90 provides the header 505 to the user 400 (Step S710) and receives a request from the user 400 for selecting one or more web documents that matches the user's request (Step S720). Then it searches for one or more web documents that matches the user's request in index DB 70 in order to retrieve web document information and web images of the found web documents, respectively, from the web document DB 40 and the web image DB 50, respectively (Steps S730 and S740). Next, the web service unit 90 determines whether thumbnails are selected (Step S750). If the thumbnails are selected, step S760 is performed; otherwise, step S770 is taken. At step S760, the web service unit 90 provides the selected thumbnail images to the user 400. On the other hand, at step S770, it provides web images and web document information simultaneously to the user 400. Finally a footer 502 is provided to the user 400 (Step S780).

FIG. 11 illustrates a display layout for providing favorite sites.

A header 121, e.g., X2SEARCH MY FAVORITE, may be displayed at the top of the layout. A favorite site tree 122 is displayed on the left. Iconic web images 123 of web sites of a selected folder of the favorite site tree 122 are placed at the right. A footer 502 is displayed as similarly as in FIG. 3.

FIG. 12 presents a flow chart for showing the favorite site list as in FIG. 11.

The web service unit 90 receives a request for a favorite site search from the user 400 (Step S810) and prompts the user 400 for user information. The user managing unit 25 receives a user ID and password from the user 400 via the web service unit 90 and compares them to the user ID and password registered at the user managing DB 20 to verify the user 400 (Step S820). The user managing unit 25 retrieves a list of favorite sites from the user managing DB 20 and provides it to the web service unit 90 (Step S830). In response to the list of favorite sites, the web service unit 90 produces the favorite site tree 122 (Step S840) and also provides the header 121 (Step S850). It further retrieves the iconic images of the web sites included in the top level folder of the favorite site tree 122 and provides them in a thumbnail format (Step S860). The footer 502 is provided to the user 400 (Step S870). Next, the web service unit 90 receives a folder selection input when the user 400 selects a folder in the favorite site tree 122 (Step S880). It retrieves the iconic images of the web sites included in the selected folder from the web image DB 50 (Step S890). Finally, the web service unit 90 provides the retrieved web iconic images 123 in the thumbnail format to the user 400 (Step S895).

FIG. 13 illustrates an exemplary browser layout of slideshow. The slideshow browser is displayed after the web images are retrieved. Large web images are shown one after another with a preset time interval between two consecutive images. The time interval is selected by clicking a time interval button 165. A start/pause button 161 is used to start or pause the slideshow. If the start/pause button 161 is clicked during slideshow, the slideshow is paused. During the pause, a user can move to the previous or next web image by clicking a previous slide button 163 or a next slide button 162, respectively. The slideshow is restarted when the start/pause 161 is clicked again. And, during the pause, a user may add the web site corresponding to the displayed image to the favorite site list by clicking an add-to-favorite button 164.

FIG. 14 shows an exemplary layout for adding a site to the favorite site list. A header 171, e.g., X2SEARCH ADD TO FAVORITE, may be displayed at the top of the layout. On the left, a favorite site tree 172 is displayed. On the right, there are provided the web image 173 and the title 174 of a site to be added. Also shown are an add folder button 175 and an add site button 176. When the add site button 176 is clicked, the web site corresponding to the web image 173 is registered in a selected folder of the favorite site tree 172. When the add folder button 175 is clicked, another folder is produced below the selected folder of the favorite site tree 172.

FIG. 15 offers a flow chart for adding a site to the favorite site list.

The web service unit 90 receives a request from the user 400 for entering a document to the favorite site and transfers the request to the user managing unit 25 (Step S1810). The user managing unit 25 verifies the user 400 (Step S1820), retrieves the favorite site list from the user managing DB 20 (Step S1830) and provides the same to the web service unit 90. In response to the favorite site list retrieved, the web service unit 90 produces the favorite site tree (Step S1840) and provides the header 171 to the user 400 (Step S1850). It then provides the favorite site tree 172 to the user 400 and the selected web image 173 and the title 174 (Steps S1860 and S1870). It may provide the footer 502 (Step S1880). Then, it receives an add request from the user 400 (Step S1890) and transfers the same to the user managing unit 25, which registers the folder and the web site as the favorite site in the user managing DB 20 (Step S1895).

As described above, because the inventive search system stores web images continuously collected by a robot agent in its own database, a user's search efficiency dramatically increases as the user can view the web images of searched web sites even before the user actually connects to those sites and find out what the contents of the web sites are. While there has been described and illustrated system and method for facilitating Internet search by providing web document layout image, it will be apparent to those skilled in the art that variations and modifications are possible without deviating from the broad principles and teachings of the present invention which should be limited solely by the spirit and scope of the claims appended hereto.

What is claimed is:

1. A search system on the Internet for providing a search result in response to search criteria received from a user, comprising:
   a robot agent for extracting web document information and layout images of web documents from web sites via the Internet, wherein the robot agent includes:
   a text collecting means for visiting web sites, downloading web documents from the visited web sites and extracting web document information from the web documents;
   a text queue for storing URLs of web sites to be visited by the text collecting means;
   an image collecting means for visiting web sites, downloading web documents from the visited sites and generating web images from the web documents to register the web images in a second database;
   an image queue for storing the URLs of web sites to be visited by the text collecting means and the image collecting means; and
   a queue managing means for controlling the text queue to provide a URL having a highest visiting priority in the text queue to the text collecting means when the text collecting means requests a URL from the queue managing means and registering the web document information from the text collecting means m a first database;
   the first database for storing the web document information extracted by the robot agent;
   the second database for storing the layout images created from the web documents extracted by the robot agent; and
   a search means for retrieving web document information and layout images from the first database and the second database, respectively, in response to a search request.

2. The system of claim 1, wherein the queue managing means computes the visiting priority of the URLs to distribute the URLs at the text queue.

3. The system of claim 2, wherein the search means includes:
   an indexing means for extracting key words of said web document information from the first database;
   a third database for storing the keywords for each web document;
   an index searching means for determining a set of web documents, corresponding to a keyword from the user;
   a first retrieving means for retrieving said web document information and layout image for each of the web documents from the first database and the second database respectively; and
   a first output means for providing the retrieved web document information and the layout image in a preselected viewing format in an order of visit numbers to the web documents.

4. The system of claim 3, wherein said preselected viewing format is one of three formats, a first one of which displays the web document information and layout image for each web document simultaneously, a second one of which displays thumbnails of the layout images and a third one of displays the layout images one after another at a predetermined time interval.

5. The system of claim 4, wherein the web document information includes title and brief description of a web document.

6. The system of claim 2, further comprising:
   a fourth database for storing a favorite site list including preselected web sites of the user;
   a second retrieving means for retrieving the layout images of the web sites in the favorite site list from the second database in response to a user request; and
   a second output means for providing the favorite site list and the retrieved layout images in a thumbnail format.

7. The system of claim 6, further comprising:
   a fifth database for storing user information for each user; and
   a verifying means for directing the second output means to provide the favorite site list and the retrieved layout images in a thumbnail format, only if user information sent from the user is identical to the user information stored at the fifth database.

8. The system of claim 7, wherein the user information includes a user identification and password.

9. The system of claim 1, wherein the search means provides the layout images in a thumbnail format.

10. The system of claim 1, wherein the search means provides the layout images one after another at a predetermined time interval.

* * * * *

UNITED STATES PATENT AND TRADEMARK OFFICE
CERTIFICATE OF CORRECTION

| | | |
|---|---|---|
| PATENT NO. | : 7,099,861 B2 | Page 1 of 1 |
| APPLICATION NO. | : 09/877853 | |
| DATED | : August 29, 2006 | |
| INVENTOR(S) | : Seok Ho Youn | |

It is certified that error appears in the above-identified patent and that said Letters Patent is hereby corrected as shown below:

Sheet 4 of 15 drawings, ref. num. 800 (Fig. 4), line 1, above "SEARCH" delete "FAVORATE" and insert -- FAVORITE--, therefor.

Sheet 9 of 15 drawings, ref. num. S640 (Fig. 9), line 2, before "AND" delete "IMFORMATION" and insert --INFORMATION--, therefore.

Sheet 10 of 15 drawings, ref. num. S740 (Fig. 10), line 2, before "AND" delete "IMFORMATION" and insert --INFORMATION--, therefor.

Sheet 13 of 15 drawings, ref. num. 164 (Fig. 13), line 1, after "ADD TO" delete "FAVORATE" and insert --FAVORITE--, therefor.

Col. 9, line 39, in claim 1, after "means" delete "m" and insert --in--, therefor.

Col. 10, line 25, in claim 5, after "includes" insert --a--.

Signed and Sealed this

Thirtieth Day of January, 2007

JON W. DUDAS
*Director of the United States Patent and Trademark Office*